United States Patent [19]
Maruniak et al.

[11] 3,817,390
[45] June 18, 1974

[54] NON-METALLIC, ONE-PIECE FILTER STRAINER HEAD

[76] Inventors: Adam B. Maruniak, 123 W. Franklin St., Otsego, Mich. 49078; Zigfrids Jirgens, Sr., 8388 W. D Ave., Kalamazoo, Mich. 49009

[22] Filed: Aug. 18, 1972

[21] Appl. No.: 281,823

[52] U.S. Cl. ............................................. 210/460
[51] Int. Cl. ......................................... B01d 27/00
[58] Field of Search .......... 210/499, 451, 452, 460, 210/463

[56] References Cited
UNITED STATES PATENTS

| | | | |
|---|---|---|---|
| 243,446 | 6/1881 | Haggerty | 210/460 X |
| 1,573,067 | 2/1926 | Holland | 210/463 |
| 3,163,229 | 12/1964 | Salisbury | 210/460 X |
| 3,440,802 | 4/1969 | Rosaen et al. | 210/90 X |

Primary Examiner—Samih N. Zaharna
Assistant Examiner—Richard W. Burks
Attorney, Agent, or Firm—Gordon W. Hueschen

[57] ABSTRACT

A filter strainer head comprises a pair of opposed hollow half-shells made of a moldable plastic resin and provided with outwardly extending peripheral flange on each half-shell. The flanges are in an abutting relationship relative to one another and a peripheral bead of a moldable plastic resin is integrally fused to both of the abutting flanges. At least one of the half-shells is provided with a plurality of filtering openings, and one of the half-shells is provided with a fluid outlet opening.

4 Claims, 3 Drawing Figures

3,817,390

NON-METALLIC, ONE-PIECE FILTER STRAINER HEAD

BACKGROUND OF THE INVENTION

This invention relates to strainer means. In one aspect this invention relates to filter strainer heads suitable for use with boiler feed water treatment facilities.

Raw water cannot be used in a modern boiler plant due to the presence of scale-forming constituents such as calcium and magnesium contained therein. Two detrimental effects are caused by boiled scale. First, the scale acts as an insulating layer resulting in heat losses and inefficient boiler operation. Secondly, the increased temperature gradient causes overheating of boiler tubes with attendant tube failures. In a modern high temperature boiler, scale formation is a very serious matter because even a thin layer of scale will elevate the temperature of boiler tube walls to a dangerously high value.

For the foregoing reasons the so-called water hardness constituents, e.g., calcium and magnesium, are reduced to lowest practical limits, usually by means of a bed of an ion-exchange resin or mineral. Such a process is commonly referred to as water softening and is accomplished by passing hard water downwardly through a vertical filter bed of an ion-exchange material. Treated boiler feed water is then recovered from the filter bed by means of a plurality of filter strainer heads situated at the bottom of the bed and communicating via one or more common manifolds to a treated boiler feed water outlet.

From time to time the bed of ion-exchange material has to be regenerated and the filter strainer heads subjected to a backwash operation which involves the passing of hot water through the filer strainer heads in a reverse flow direction. The backwash operation subjects the filter strainer heads to a substantial pressure.

It is known to make the filter strainer heads from metal so as to avoid any bursting problems during backwash operations; however, with metal as the material of construction, corrosion and cost of manufacture are substantial drawbacks. Attempts have also been made to manufacture filter strainer heads from a moldable plastic resin such as nylon, for example; however, the desired strainer head configuration cannot be produced in a single operation and the several parts of a plastic filter strainer head have to be made so as to threadedly engage each other or have to be glued together. In either case, filter strainer head failures have been encountered at the junctures of the several parts which failures have necessitated the shutdown of the water treatment facility and the complete removal of the ion-exchange material before the necessary maintenance operations could be carried out.

It is an object of the present invention to obviate the foregoing drawbacks of a non-metallic filter strainer head and to provide a low-cost, one piece filter strainer head which is capable of withstanding relatively high pressures without bursting.

It is another object of this invention to provide a method for manufacturing a hollow, one-piece shell from a moldable plastic resin.

A further object of this invention is to provide a sealing die assembly for the manufacture of a hollow shell from a moldable plastic resin.

Still other objects of the present invention will readily present themselves to one skilled in the art upon reference to the ensuing specification, the drawings, and the claims.

SUMMARY OF THE INVENTION

The present invention contemplates a non-metallic one-piece filter strainer head which comprises a pair of opposed, hollow half-shells each provided with an outwardly extending peripheral flange. At least one of the half-shells is provided with a plurality of filter openings and one of the half-shells is provided with a fluid outlet opening. The peripheral flanges on the half-shells are in an abutting relationship relative to one another and a peripheral bead of a moldable plastic resin is integrally fused to both of the abutting flanges. Preferably one of the abutting flanges is provided with a peripheral recess therein and the other of said abutting flanges is provided with a shoulder which is received within said recess.

A one-piece filter strainer head of this invention is manufactured by providing a pair of mating, hollow half-shells molded from a plastic resin and each half-shell having an outwardly extending peripheral flange; providing a seal die assembly capable of receiving said half-shells in an opposing relationship to one another; situating said half-shells in each sealing die so that said peripheral flanges of the half-shells abut one another; injecting molten plastic resin into said sealing die in contact with and around the periphery of said abutting flanges, the injected resin being at a temperature sufficiently high to melt the outer surface of said abutting flanges; and cooling the injected molten plastic resin to form an integral bead around the periphery of said abutting flanges and integrally fused to both of said abutting flanges.

DESCRIPTION OF THE PREFERRED EMBODIMENTS

Figure 1:
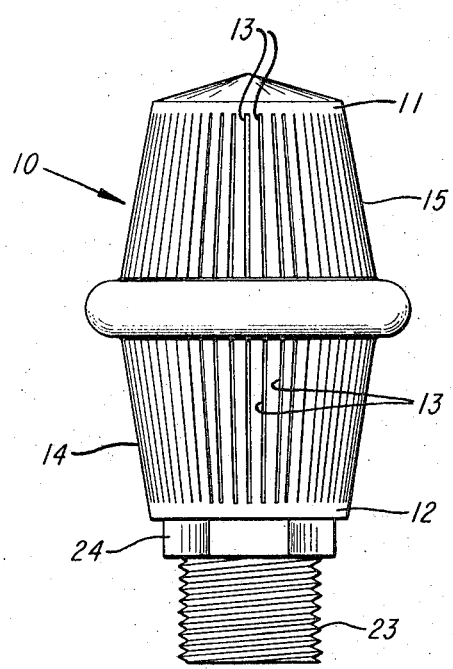
FIG. 1 is a side elevational view of a one-piece filter strainer head of this invention.
Figure 2:
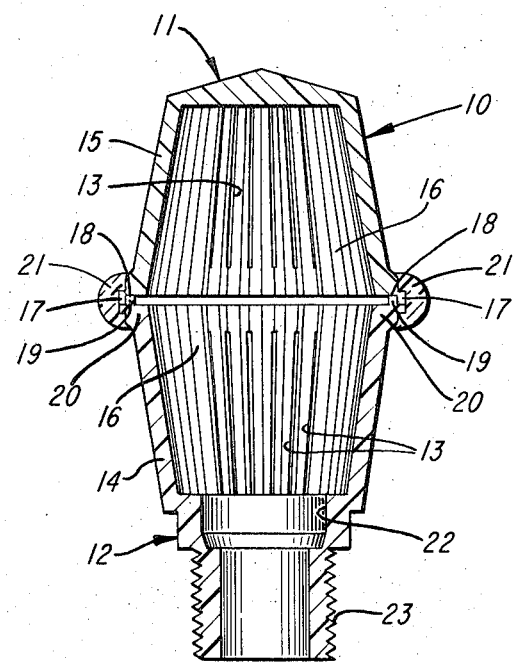
FIG. 2 is a sectional elevation of the filter strainer head shown in FIG. 1.

Referring to FIGS. 1 and 2, filter strainer head 10 comprises hollow half-shells 11 and 12 each provide with a plurality of filtering openings 13 which are elongated slots in side walls 14 and 15 of half-shells 11 and 12. The outer surfaces of side walls 14 and 15 are smooth but the inner surfaces thereof are fluted, i.e., provided with a plurality of flutes 16 which add strength to the strainer head and also minimize pressure drop across the strainer head.

Outwardly extending peripheral flange 17 of half-shell 11 is provided with peripheral groove or recess 18 into which is received shoulder 19 of outwardly extending peripheral flange 20 of half-shell 12.

Half-shells 11 and 12 are integrally bonded together by peripheral bead 21 which surrounds abutting flanges 17 and 20 and is fused to both of said flanges.

Half-shell 12 is also provided with fluid outlet opening 22 through which the treated fluid collecting within filter strainer head 10 passes. Threaded connection 23, optionally provided with hexagonal bolt head 24, facilitates the mounting of filter strainer head 10 into a suitable collector manifold (not shown).

Figure 3:
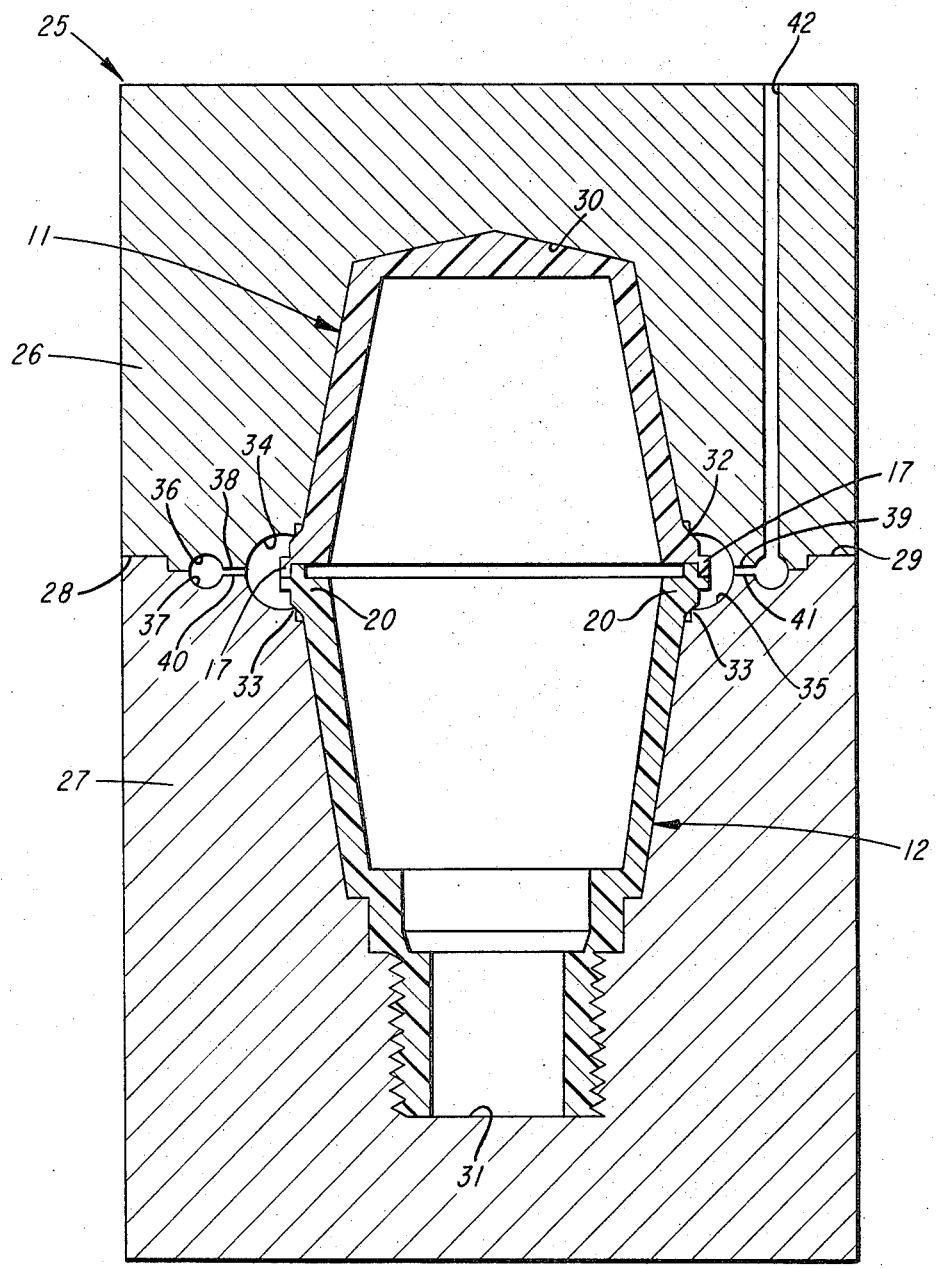
FIG. 3 is a sectional elevation of a sealing die assembly of this invention containing a pair of hollow half-shells which are to be made into an integral, one-piece filter strainer head.

Referring to FIG. 3, sealing die assembly 25 can be conveniently utilized to manufacture filter strainer heads of this invention. Sealing die assembly 25 comprises die elements 26 and 27 having respective opposed mating faces 28 and 29.

Central cavity 30 in die element 26 receives molded half-shell 11, and central cavity 31 in die element 27 receives molded half-shell 12. Knife edge 32 is provided in die element 26 and engages peripheral flange 17, and knife edge 33 is provided in die element 27 and engages peripheral flange 20. Grooves 34 and 35 are provided in respective mating faces 28 and 29 around knife edges 32 and 33, respectively, and together with half-shells 11 and 12 define a toroidal mold cavity for a peripheral bead such as bead 21 shown in FIG. 2. Grooves 36 and 37 are radially spaced outwardly from respective grooves 34 and 35 and together define a runner passageway for the mold cavity defined by the aforementioned grooves 34 and 35. A plurality of peripherally spaced, radially extending troughs 38 and 39 in face 28 together with corresponding complementary troughs 40 and 41 in face 29 define a plurality of gate passageways for the aforesaid mold cavity.

Molten resin is provided to the mold cavity by means of feed passageway 42 in die element 26.

In manufacturing a hollow, one-piece shell such as the filter strainer head of this invention, half-shells 11 and 12, previously molded from a plastic resin, are placed in respective central cavities 30 and 31 of die elements 26 and 27 and the die elements are brought together in a mating relationship so that peripheral flanges 17 and 20 abut each other and knife edges 32 and 33 engage flanges 17 and 20, respectively. Molten plastic resin is then injected into the resulting mold cavity of sealing die assembly 25 via feed passageway 42 so to contact and surround abutting flanges 17 and 20. The injected molten resin is at a temperature that is sufficiently high to melt the outer surface of each of said flanges and to form a fusion bond therewith. Thereafter the injected molten plastic resin is cooled to form an integral bead around the periphery of abutting flanges 17 and 20.

For the purposes of manufacturing filter strainer heads of this invention a particularly suitable moldable plastic resin is a polyamide resin such as nylon. However, the present invention can also be practiced with other moldable resins such as phenolic resins, acrylonitrile-butadiene-styrene (ABS) resins, polyethylene resins, polystyrene resins, and the like, depending on the intended end use of the final article of manufacture. Also, in the manufacture of filter strainer heads, the moldable plastic resin used to manufacture and filter strainer head half-shells and the moldable plastic resin used to form the peripheral bead is the same, e.g., nylon; however, in other applications of this invention the moldable plastic resin utilized to form the peripheral bead can be different from the moldable plastic resin utilized in forming the several parts of the article of manufacture as long as a fusion bond can be established between the formed peripheral bead and the outwardly-extending abutting flanges of said several parts.

The foregoing discussion and the accompanying drawings are intended to be illustrative and are not to be construed as limiting. Still other variations within the spirit and scope of this invention are possible and will become apparent to the skilled artisan.

We claim:

1. A non-metallic one-piece filter strainer head which comprises
    a pair of opposed hollow half-shells made of a moldable plastic resin having a plurality of filtering openings in at least one of the half-shells, and one of said half-shells being provided with a fluid outlet opening;
    an outwardly extending peripheral flange on each half-shell, said flanges being in an abutting relationship relative to one another; and
    a peripheral bead of a moldable plastic resin integrally fused to both of said abutting flanges thereby forming said filter strainer head.

2. The filter strainer head in accordance with claim 1 wherein the filtering openings are elongated slots in the side walls of the half-shell.

3. The filter strainer head in accordance with claim 1 wherein on of said abutting flanges is provided with a peripheral recess and the other of said abutting flanges is provided with a shoulder which is received within said recess.

4. The filter strainer head in accordance with claim 1 wherein the moldable resin is polyamide resin.

* * * * *